US010036617B2

(12) United States Patent
Mackal

(10) Patent No.: US 10,036,617 B2
(45) Date of Patent: *Jul. 31, 2018

(54) INFLATOR WITH HIGH FLOW RATE

(71) Applicant: Halkey-Roberts Corporation, St. Petersburg, FL (US)

(72) Inventor: Glenn H. Mackal, South Pasadena, FL (US)

(73) Assignee: Halkey-Roberts Corporation, St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/887,252

(22) Filed: Oct. 19, 2015

(65) Prior Publication Data
US 2017/0108315 A1   Apr. 20, 2017

(51) Int. Cl.
*F42B 3/04* (2006.01)
*A41D 13/018* (2006.01)

(52) U.S. Cl.
CPC .............. *F42B 3/04* (2013.01); *A41D 13/018* (2013.01)

(58) Field of Classification Search
CPC ... F42B 3/04; F42B 3/045; F42B 3/06; A41D 13/018; B63C 9/18
USPC ..................................... 102/530, 531; 222/5
See application file for complete search history.

(56) References Cited

U.S. PATENT DOCUMENTS

| 2,780,389 | A | * | 2/1957 | Sandgren | A62C 13/003 137/68.13 |
| 2,894,658 | A | * | 7/1959 | Spidy | B63C 9/24 222/5 |
| 3,690,695 | A | * | 9/1972 | Jones, Sr. | H01H 35/14 102/531 |
| 4,062,112 | A | * | 12/1977 | Lake | B23D 15/145 30/228 |
| 4,475,664 | A | * | 10/1984 | Mackal | B63C 9/24 222/5 |
| 4,627,822 | A | * | 12/1986 | Esposito | B63C 9/18 441/92 |
| 5,060,974 | A | * | 10/1991 | Hamilton | B60R 21/272 280/736 |
| 5,076,468 | A | * | 12/1991 | Mackal | B63C 9/24 222/5 |
| 5,273,312 | A | * | 12/1993 | Coultas | B60R 21/272 222/5 |
| 5,351,989 | A | * | 10/1994 | Popek | B60R 21/272 222/5 |
| 6,089,403 | A | | 7/2000 | Mackal | |
| 7,178,547 | B2 | | 2/2007 | Mackal | |
| 9,127,920 | B2 | * | 9/2015 | Joseph | F42B 10/40 |

* cited by examiner

Primary Examiner — Bret Hayes
(74) Attorney, Agent, or Firm — GrayRobinson, P.A.

(57) ABSTRACT

A high flow rate inflator intended to be threaded into or onto the threaded neck of a conventional gas cylinder. The inflator comprises a spring-loaded ballasted firing pin that is retained in a cocked position by a tethered trigger pin. Upon firing by pulling on the trigger pin, the firing pin forcibly moves into engagement with a power primer mounted with a power primer holder to ignite the same, whereupon the ignition gases forcibly drives a hollow larger diameter pierce pin mounted within an interior cylinder into the frangible seal of the gas cartridge to cut a large-bore hole therethrough and allow gas escaping from the gas cylinder to flow at a high rate through the inflator into an inflatable device.

10 Claims, 17 Drawing Sheets

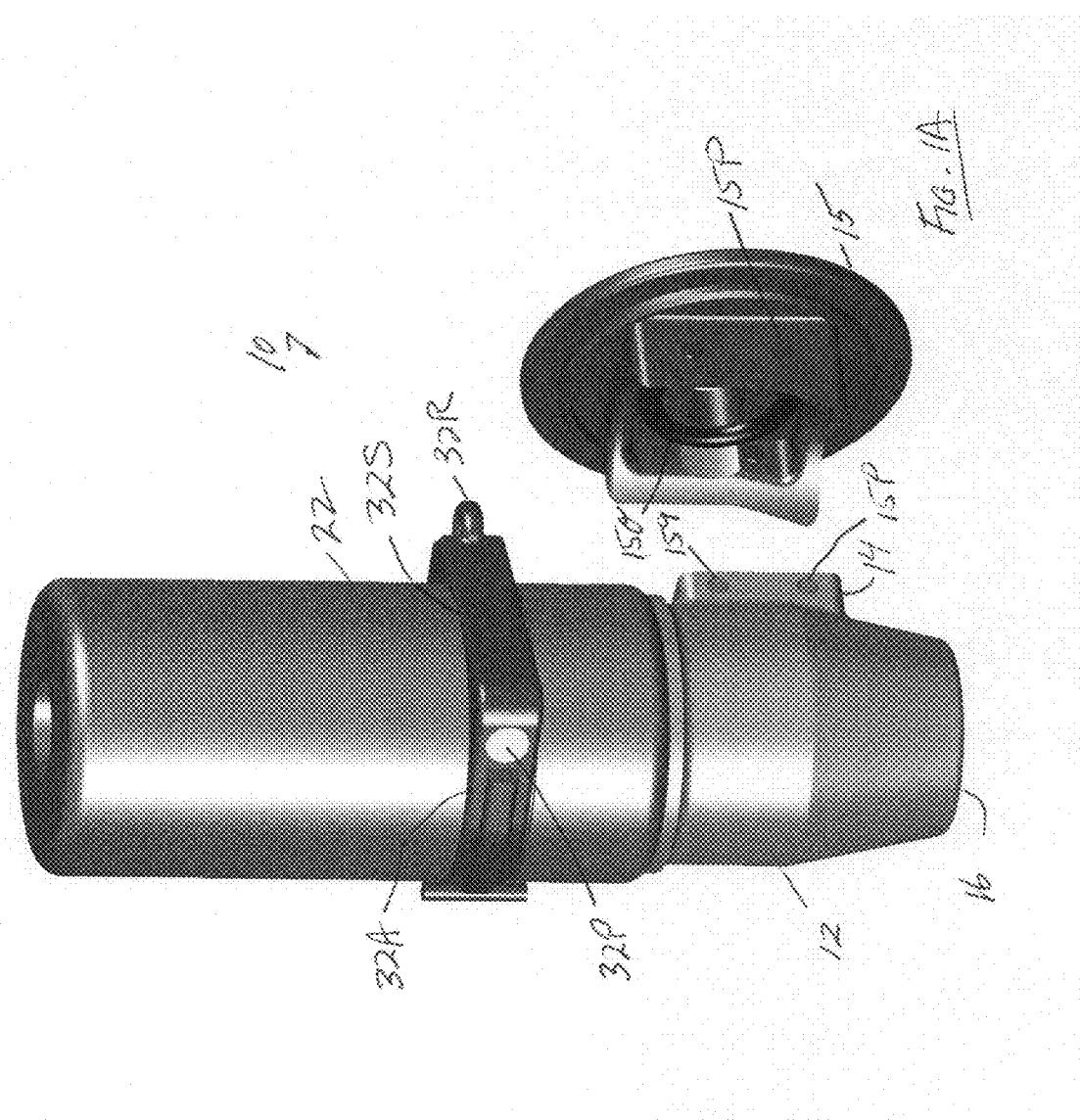

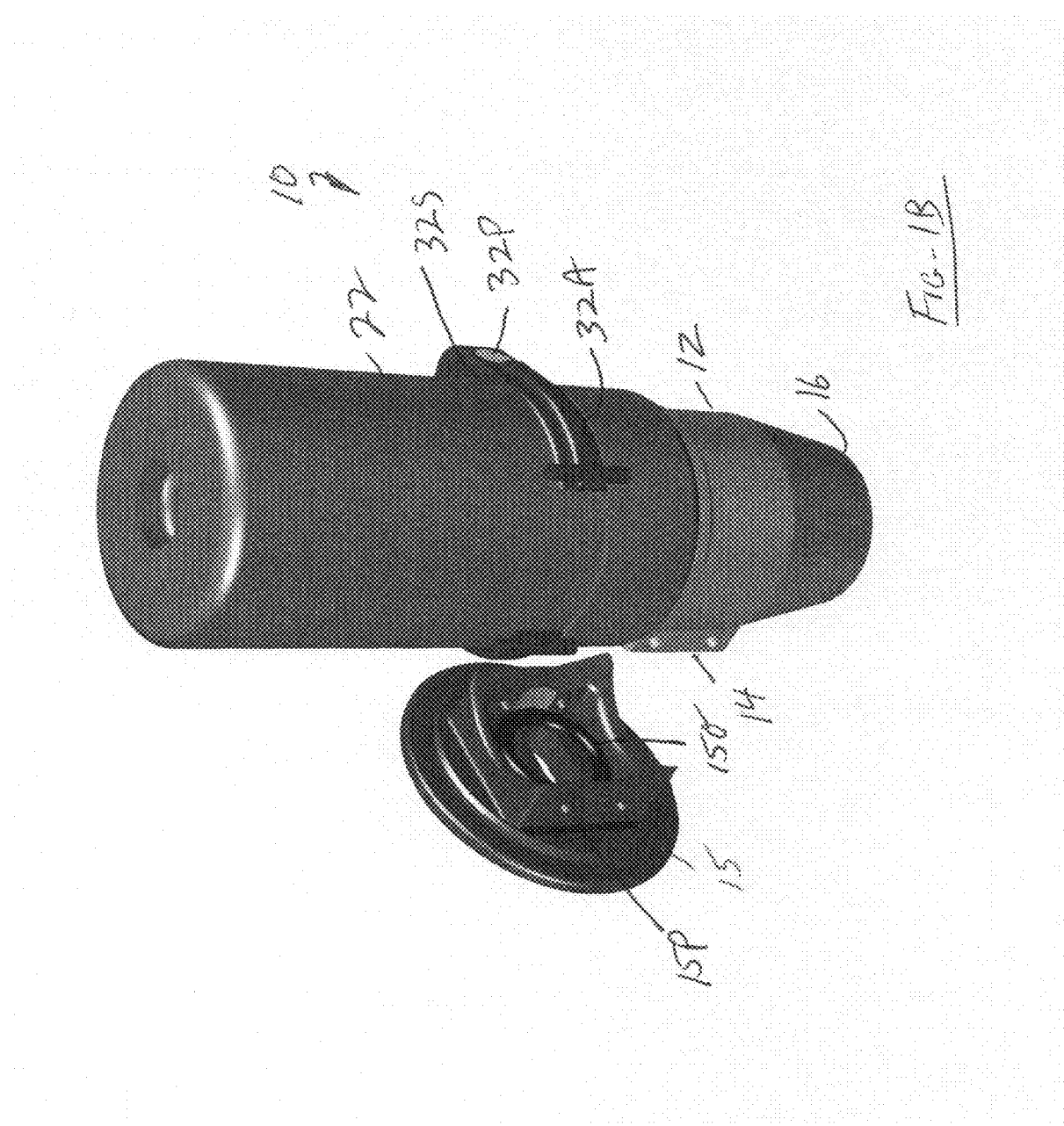

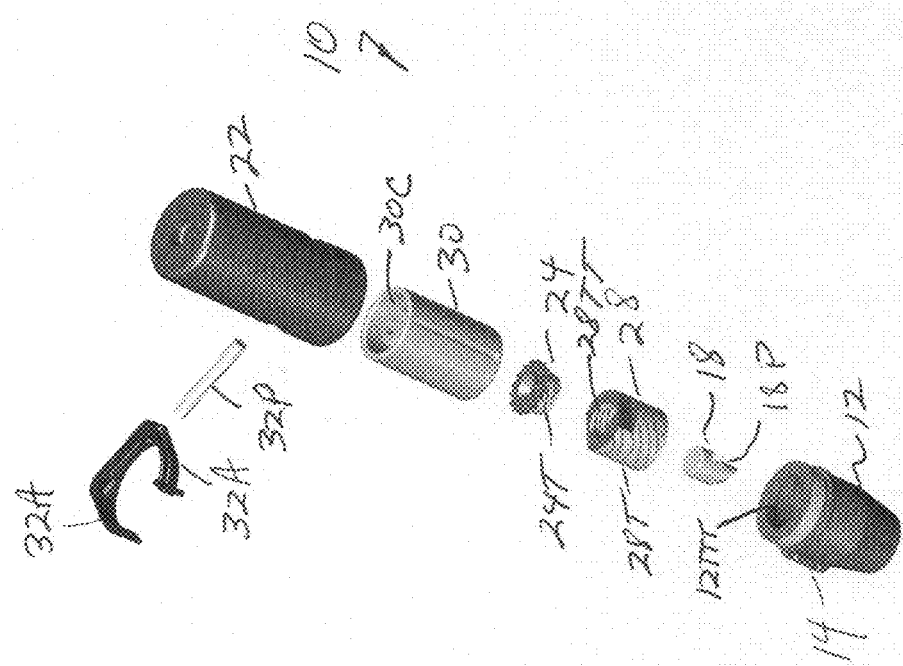

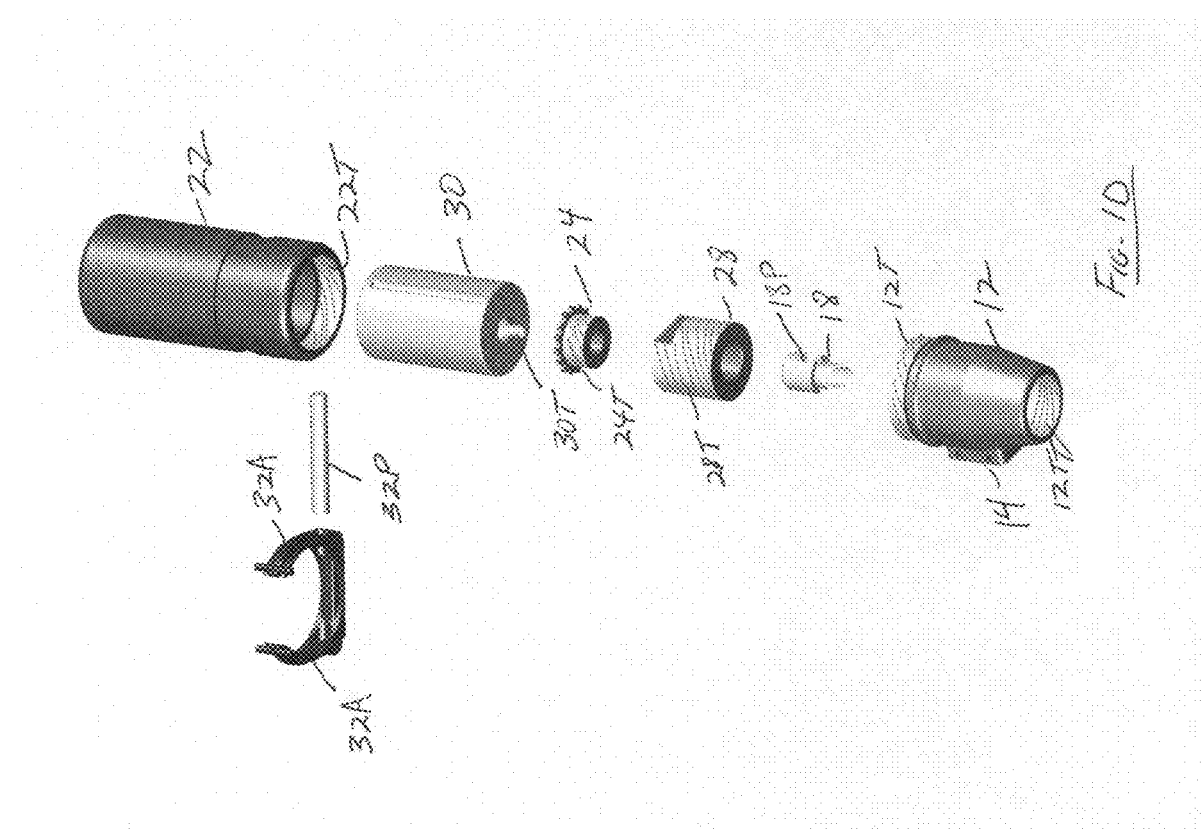

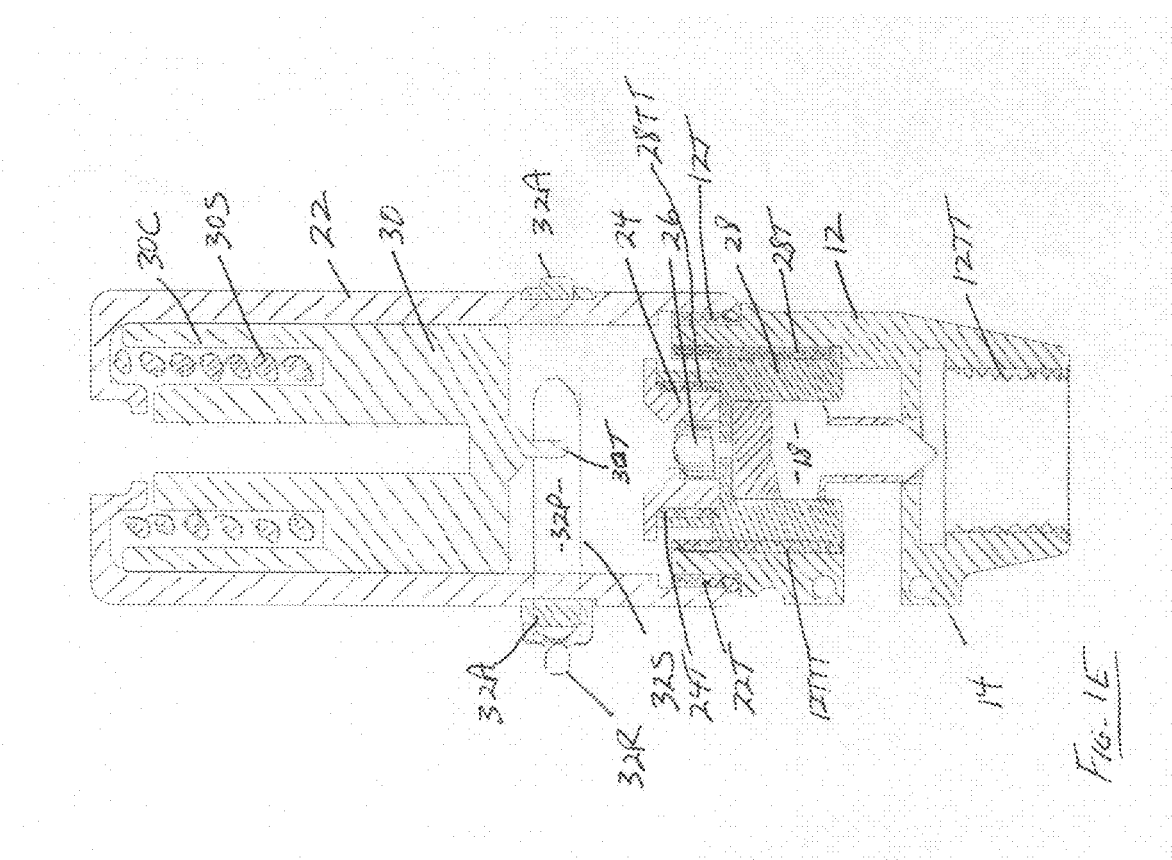

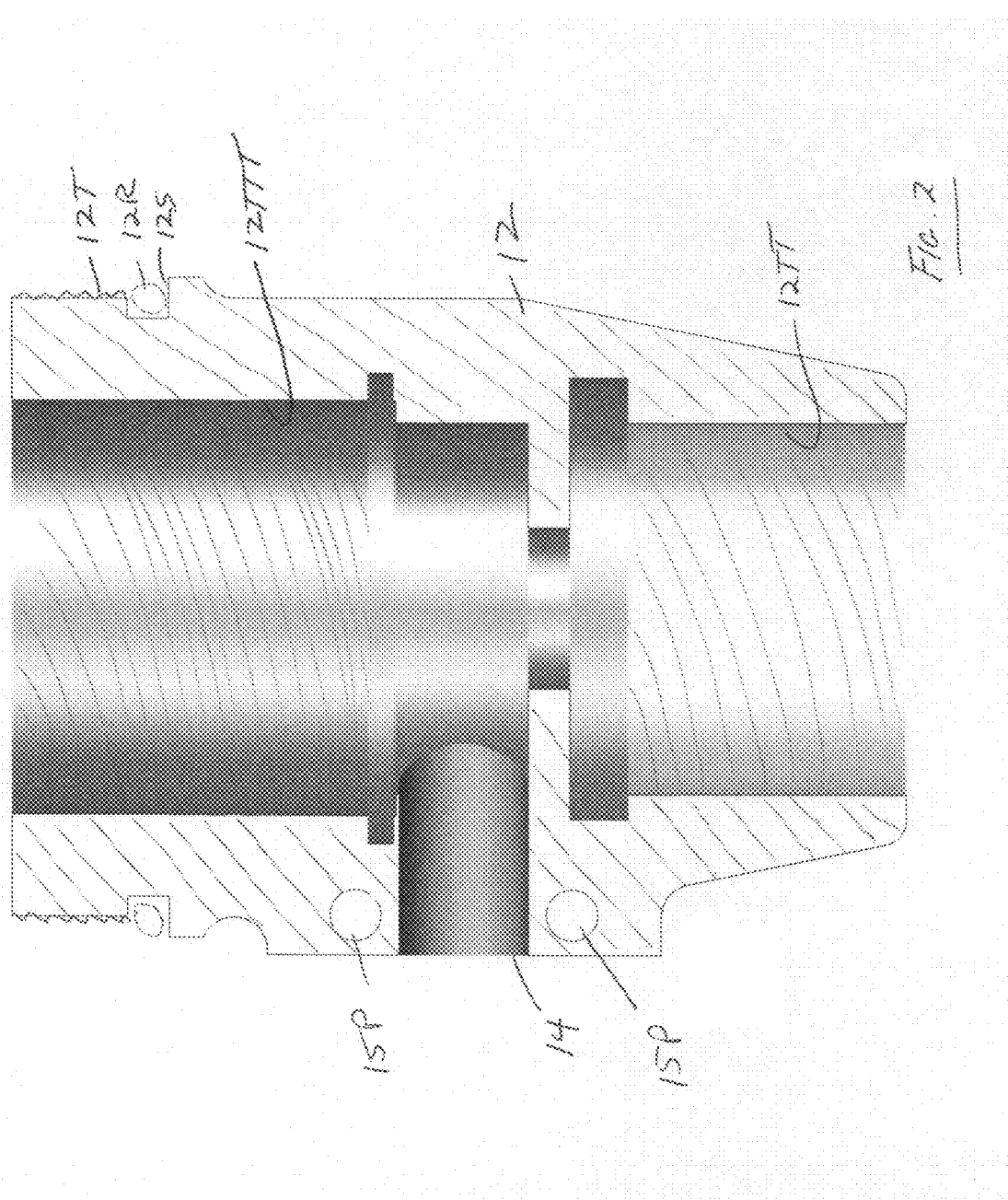

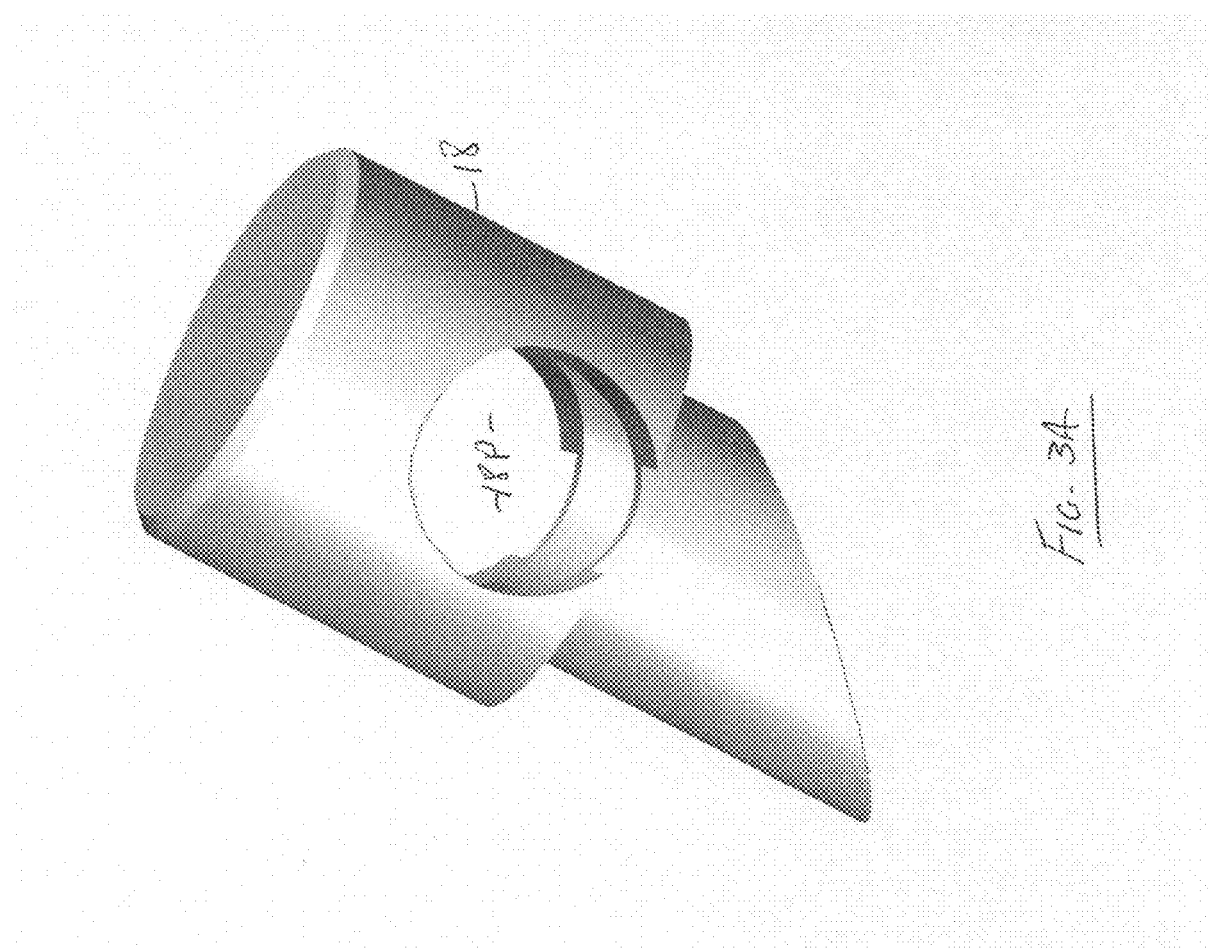

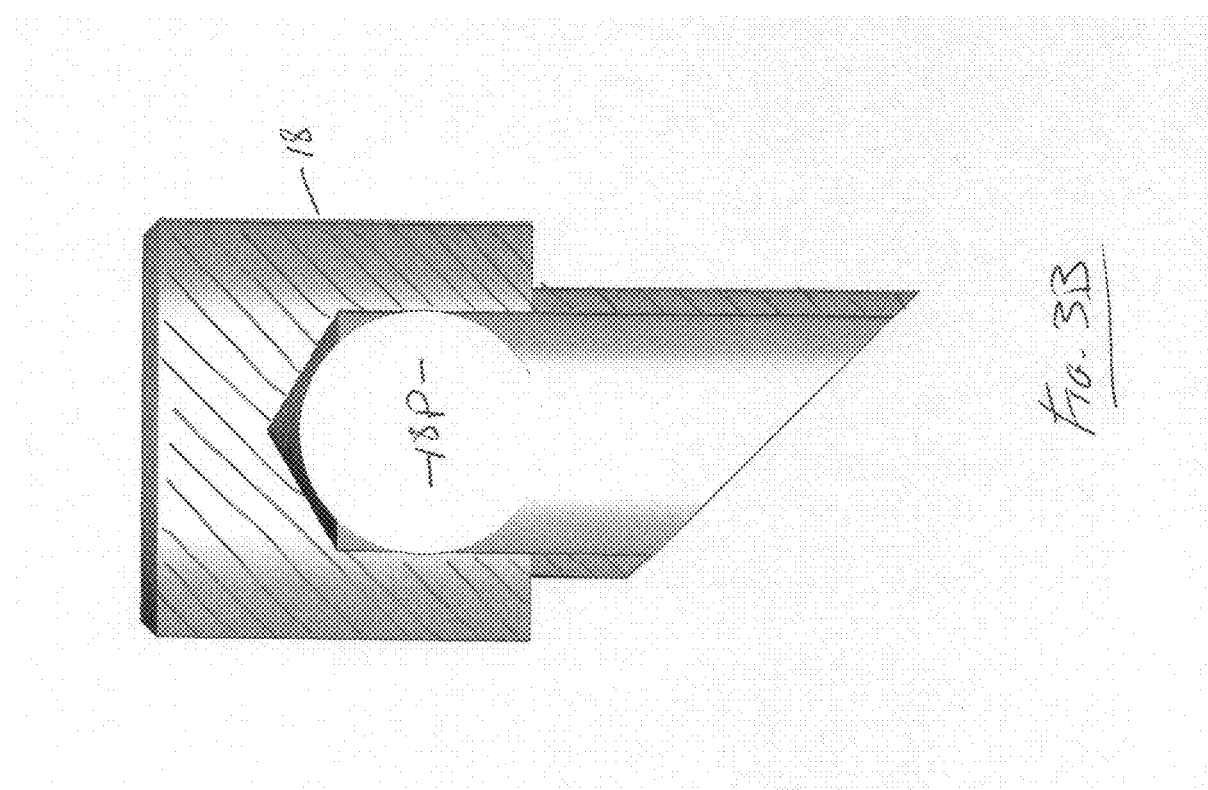

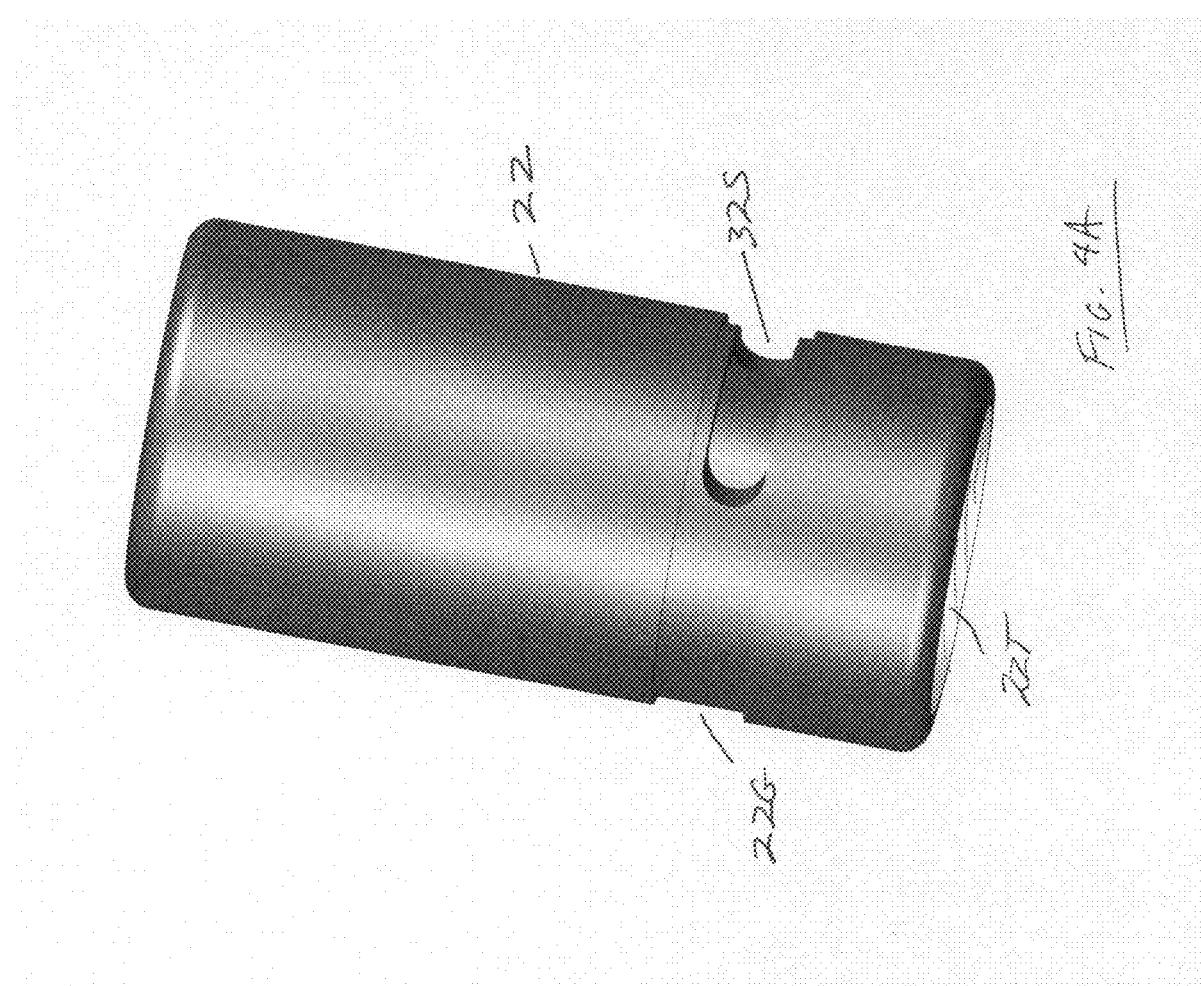

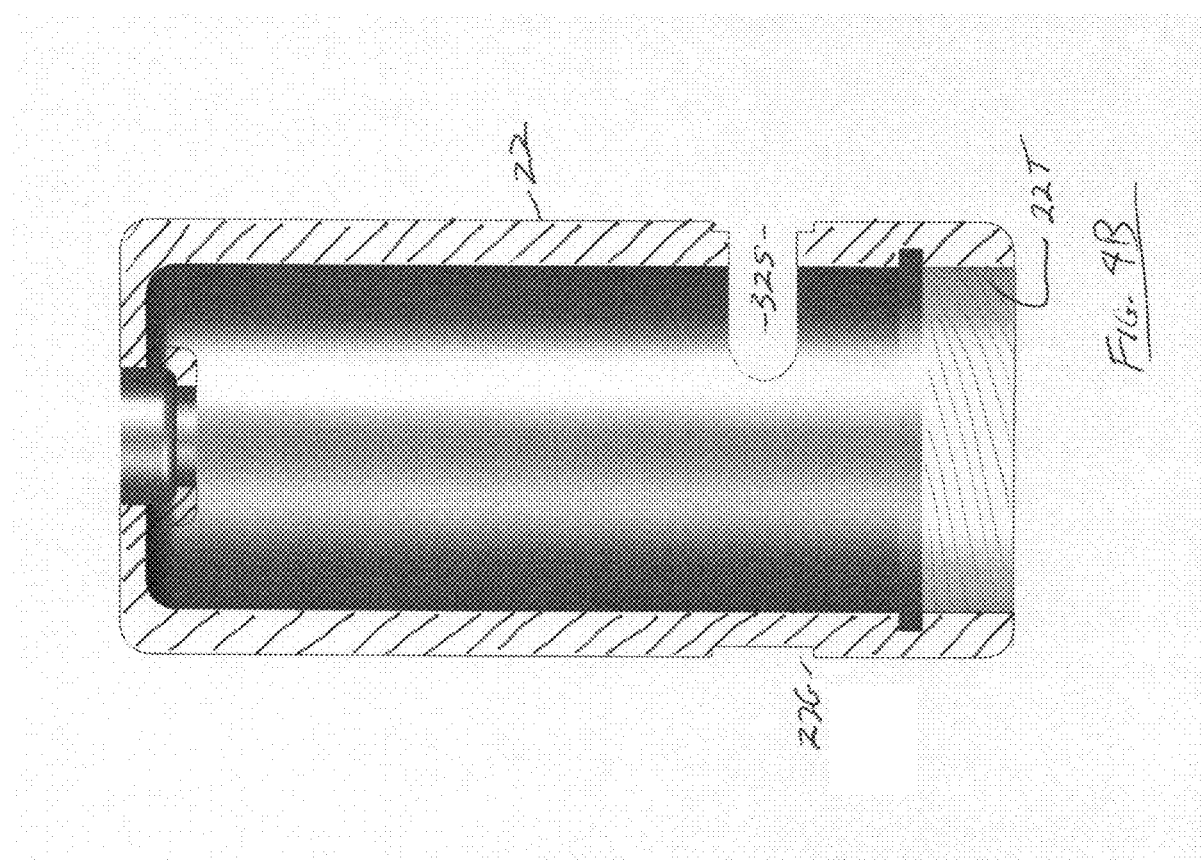

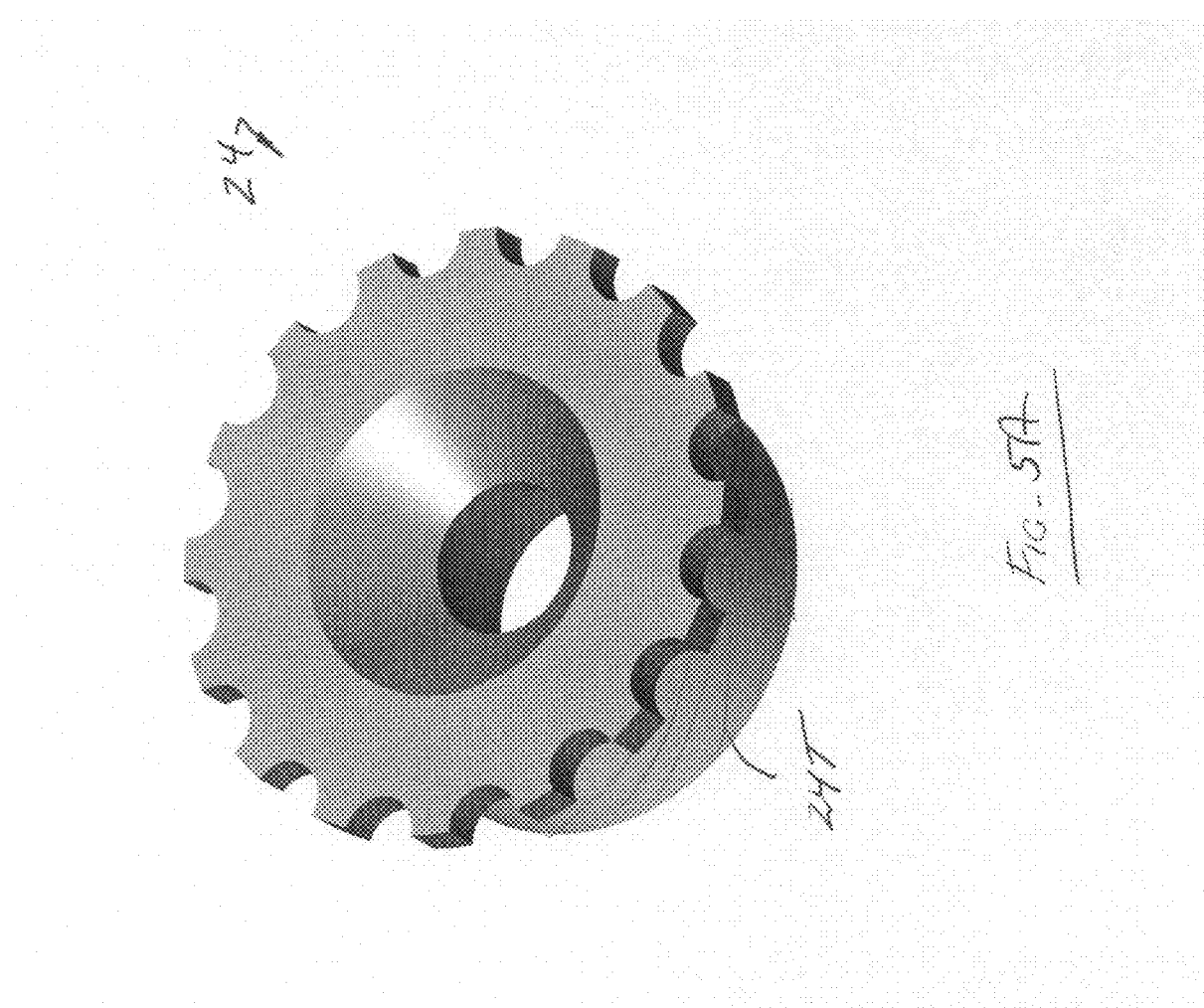

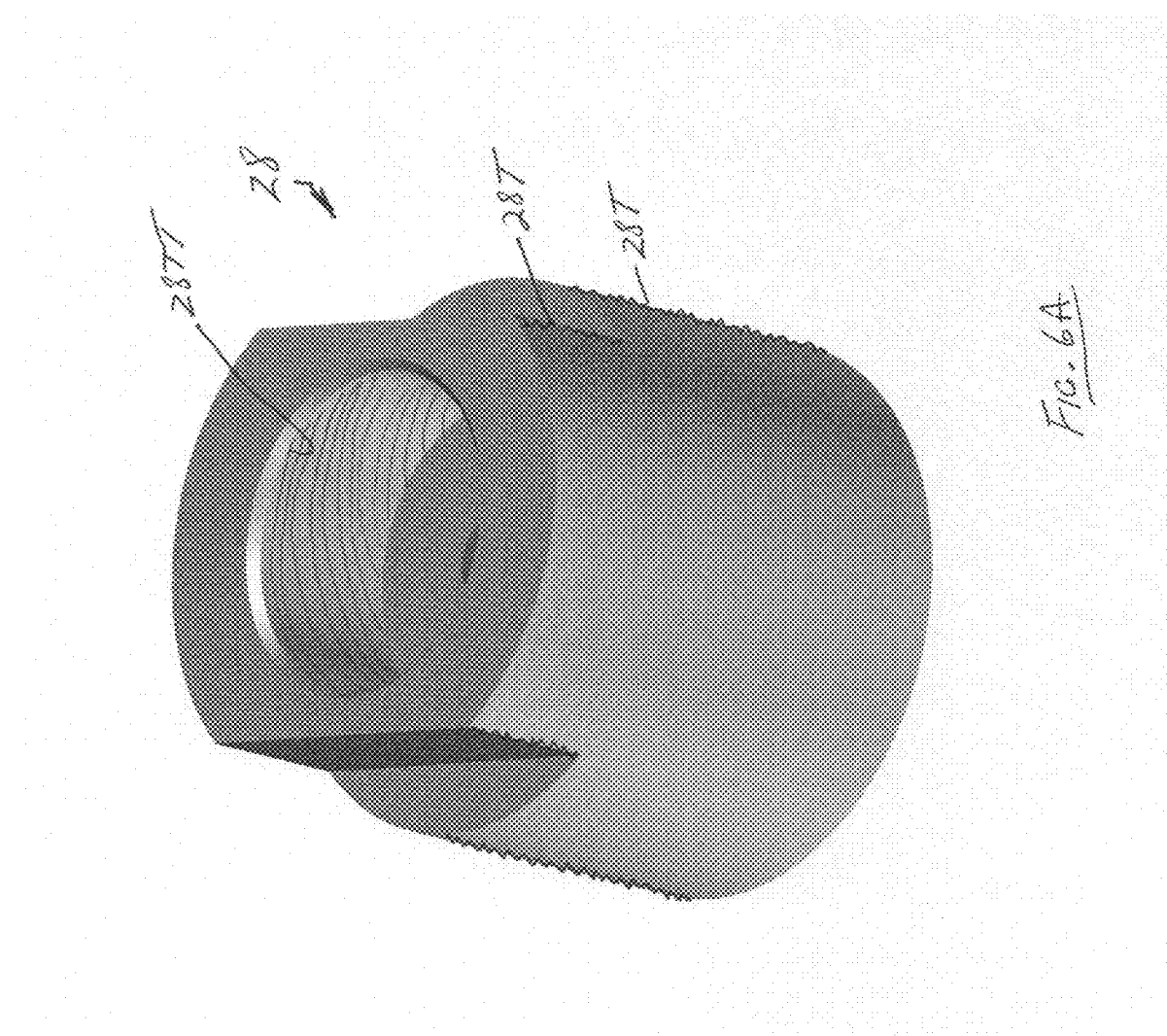

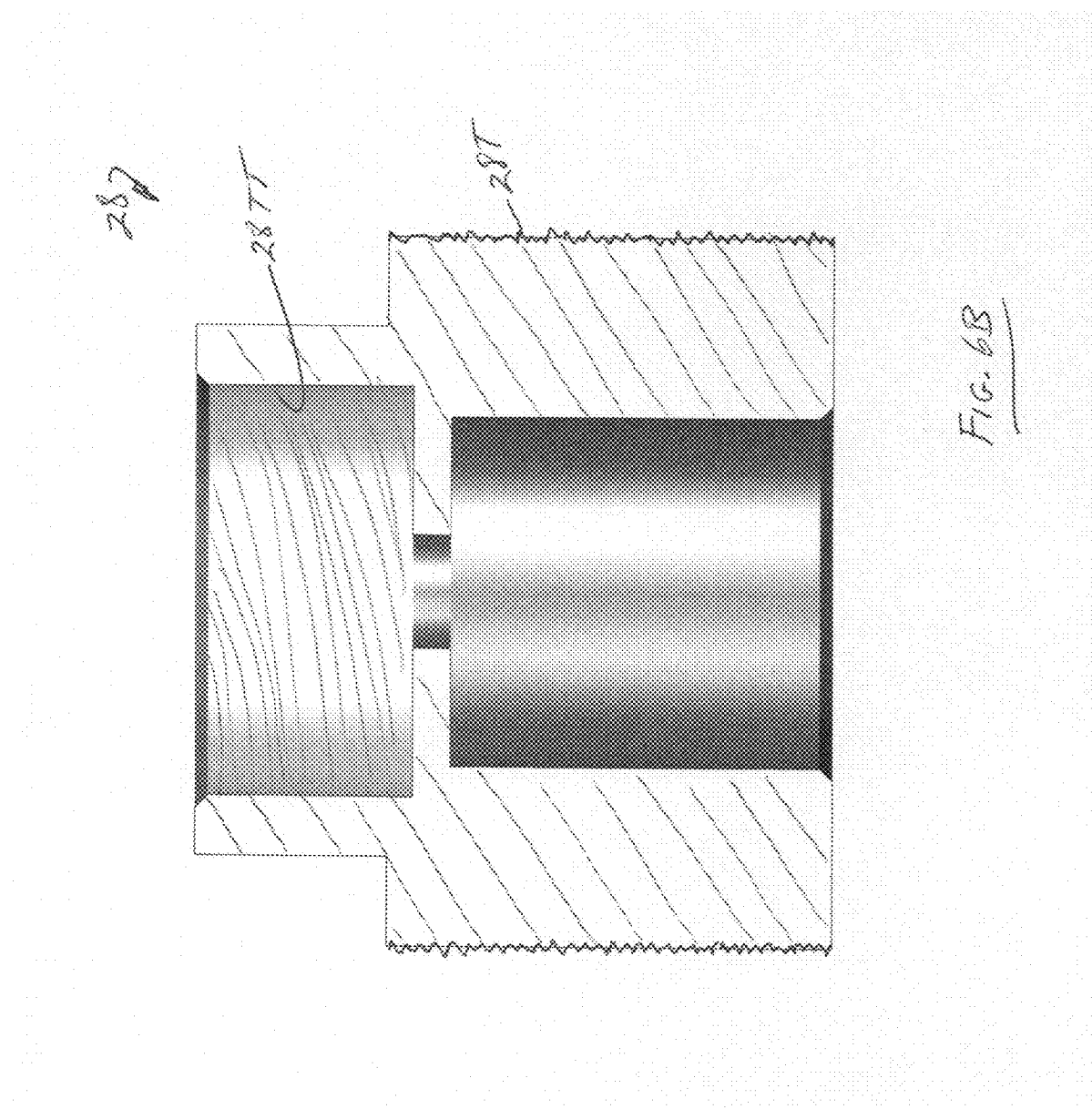

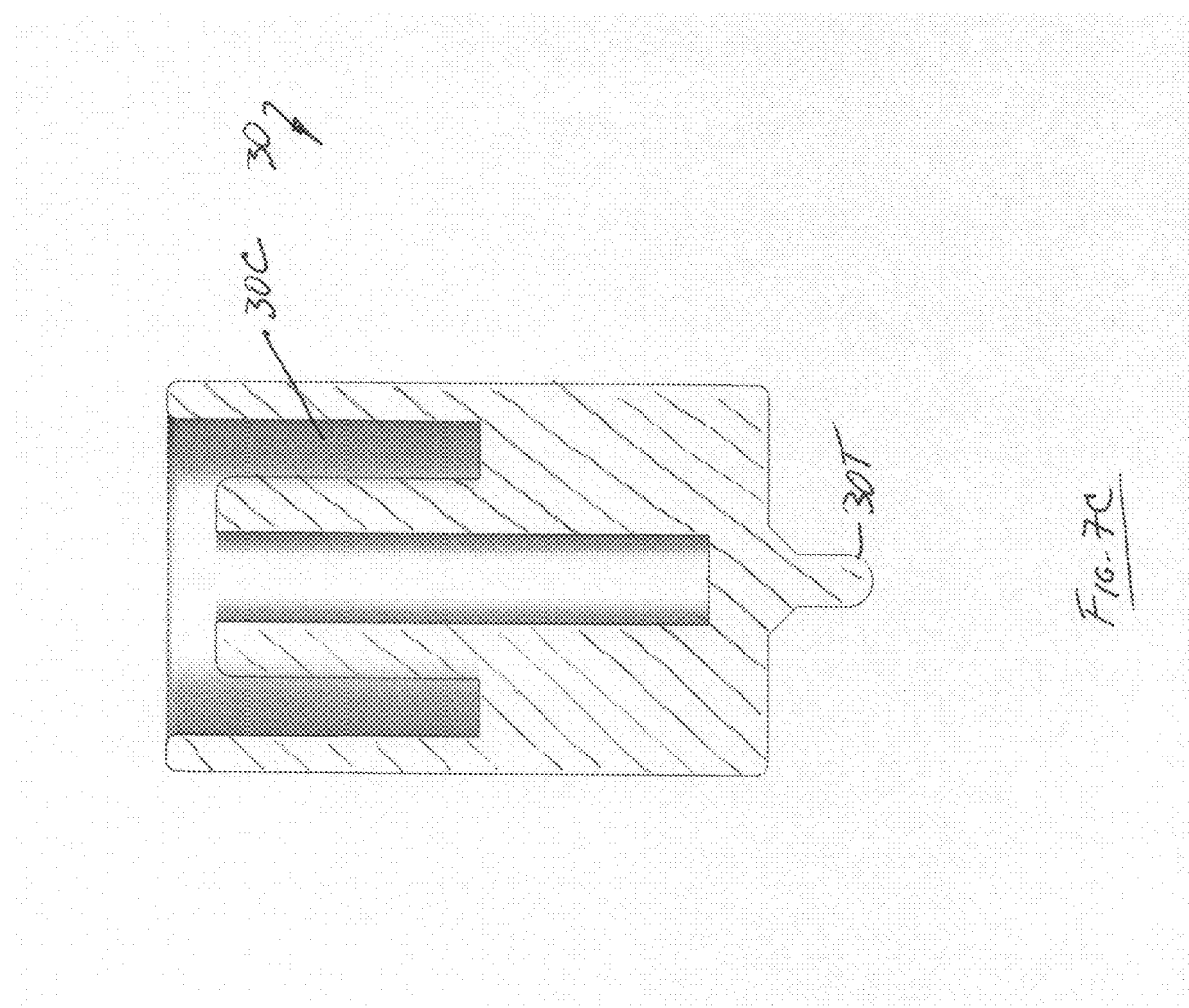

INFLATOR WITH HIGH FLOW RATE

CROSS-REFERENCE TO RELATED APPLICATIONS

This application claims priority of provisional application No. 62/065,750, filed Oct. 19, 2014 and 62/066,327, filed Oct. 20, 2014, the disclosures of each of which are hereby incorporated by reference herein.

BACKGROUND OF THE INVENTION

Field of the Invention

This invention relates to inflators. More particularly, this invention relates to inflation valves for compressed gas cylinders used for inflating inflatable articles such as life rafts and personal safety vests.

Description of the Background Art

Presently there exist many types of inflation valves designed to be used in conjunction with compressed gas cylinders or the like. In their simplest forms, inflation valves include a knob or handle which is turned to open a cylinder of compressed gas to inflate the inflatable article. However, even more prevalent are inflation valves for sealed gas cylinders having a sealed, frangible seal. Inflation valves of this type are operable by means of a jerk handle and lanyard cord that allow the inflatable article to be quickly inflated by a simple jerking of the handle which then forces a pierce pin to fracture the frangible seal of the gas cylinder, thereby allowing the compressed gas therein to flow out of the gas cylinder to inflate the inflatable article.

Due to the large force necessary to fracture the frangible seal of a conventional gas cylinder, particularly for raft inflators that require inflation from a large gas cartridge, more contemporary designs of inflation valves employ a powerful firing spring which is held in its cocked position by means of a sear. Upon jerking of the jerk handle by the user, the sear is released allowing the powerful spring to very forcibly force the pierce pin through the frangible seal of the gas cylinder.

To eliminate the need for inflators having powerful firing springs held in cocked positions, still more contemporary inflation valves utilize the internal pressure of the gas cylinder to assist in driving the pierce pin fully through the frangible seal. A representative inflation system with such a pneumatic assist feature, is disclosed in my U.S. Pat. Nos. 6,089,403 and 7,178,547, the disclosures of which are hereby incorporated by reference herein.

Jerk handle inflators and pneumatic assisted inflators are in widespread use in the inflator industry. However, there presently exists a need for inflators that more easily allow actuation by an inflation lanyard.

Therefore, an object of this invention to provide an improvement which overcomes the aforementioned inadequacies of the prior art devices and provides an improvement which is a significant contribution to the advancement of the inflator art.

Another object of this invention is to provide an inflator that is capable of use with compressed gas cartridges to open the frangible seal of the inflator and achieve a high flow rate.

Another object of this invention is to provide an inflator that employs a power primer which, upon firing, drives a firing pin through a frangible seal to allow gas from a gas cartridge to escape therefrom an inflate an inflatable article.

Another object of this invention is to provide an inflator that employs a power primer which, upon firing, drives a large-bore firing pin through the frangible seal of the gas cartridge to cut a larger-than-normal hole therethrough to allow gas from the gas cartridge to escape therefrom at a higher than normal rate to thereby rapidly inflate an inflatable article.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a high flow rate inflator intended to be threaded into or onto the threaded neck of a conventional gas cylinder (not shown). The inflator comprises a larger diameter pierce pin that pierces the frangible seal of the gas cartridge but cutting a large-bore hole therethrough. The large-bore hole in the frangible seal of the gas cartridge allows the gas to flow into the inflatable device at a very high rate to inflate the inflatable device very rapidly that what could be achieved with conventional narrow-bore pierce pins that merely puncture a small hole in the frangible seal of the gas cartridge. The inflator is actuated by a tether connected to an actuator trigger that maintains a spring-loaded actuator pin in its ready, cocked position.

The force necessary to force the larger diameter pierce pin through the frangible seal of the gas cartridge is achieved by the use of a power primer. In use, upon jerking of the tether, the actuator trigger releases the spring-loaded actuator pin which then strikes the power primer to fire the same. Upon firing of the power primer, the escaping gases therefrom forcibly drive the larger-diameter pierce pin to fracture the large bore hole in the frangible seal of the gas cartridge allowing gas therefrom to then rapidly flow into the inflatable device and inflate the same.

All of the gas from the gas cartridge rapidly flows into the inflatable device in a much shorter period of time (e.g., less than a second) than conventional inflators that merely pierce a small hole in the frangible seal allowing the gas to slowly (e.g., 2-3 seconds) bleed into the inflatable device.

The present invention is particularly suited for inflatable devices that need to be rapidly inflated once the tether is jerked. Exemplary devices may include personal airbags embodied in a jacket or a pair of pants that are rapidly inflated when the wearer (e.g., motorcycle or bicycle rider, horse jockey, etc.) has an accident. For example, a jockey in a horse race would not want to be encumbered by permanently-inflated airbags to break his fall but would rather want the airbags to inflate only in the event of a fall. The high-flow-rate inflator of the present invention so rapidly inflates the airbags that its tether may be connected to the horse's saddle and when the jockey starts to take a fall, the tether is pulled/jerked as the jockey is falling from the horse causing rapid inflation of the airbags before the jockey hits the ground, with hopefully the inflated airbags then minimizing the jockey's injuries that might have been otherwise sustained without the use of personal airbags (or airbags that inflate too slowly).

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIGS. 1A & 1B are perspective views of the inflator of the invention.

FIGS. 1C & 1D are exploded perspective views of the inflator.

FIG. 1E is a longitudinal cross-sectional view of the inflator.

FIG. 2 is a longitudinal cross-sectional view of the housing.

FIG. 3A is perspective view of the pierce pin of the inflator.

FIG. 3B is a longitudinal cross-sectional view of the pierce pin.

FIG. 4A is perspective view of the actuator housing of the inflator.

FIG. 4B is a longitudinal cross-sectional view of the actuator housing.

FIG. 5A is perspective view of the power primer holder of the inflator.

FIG. 6A is perspective view of the interior cylinder of the inflator.

FIG. 6B is a longitudinal cross-sectional view of the interior cylinder.

FIG. 7C is a longitudinal cross-sectional view of the firing pin.

Similar reference characters refer to similar parts throughout the several views of the drawings.

DETAILED DESCRIPTION OF THE PREFERRED EMBODIMENTS

Figure 5B:
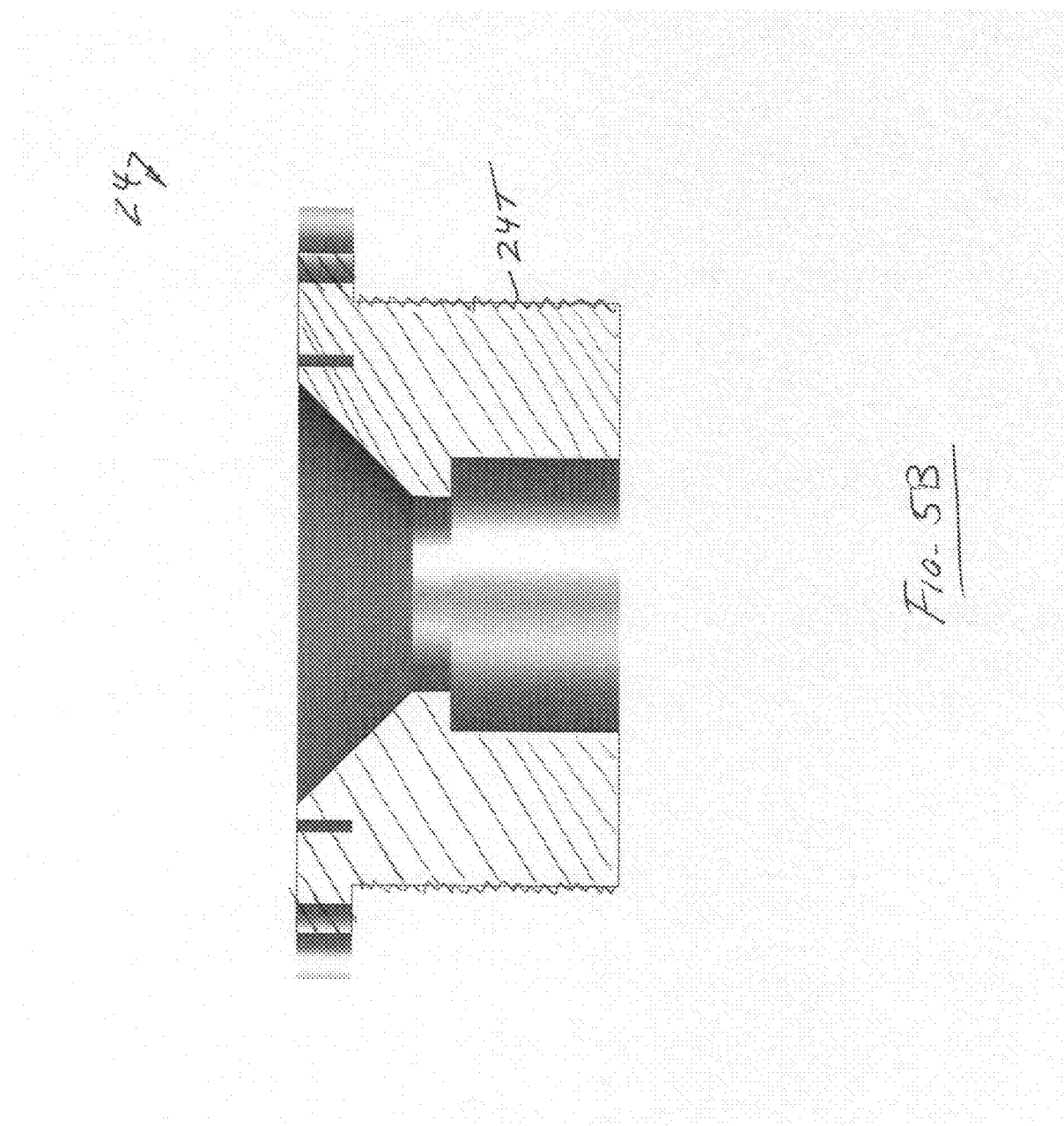
FIG. 5B is a longitudinal cross-sectional view of the primer holder.

Referring to FIGS. 1A & 1B, the inflator 10 of the invention comprises a housing 12 having a manifold 14 for sealing connection to the inflatable device by a corresponding manifold 15. Manifold 15 may be heat sealed to the inflatable device. The manifolds 14 and 15 complementarily mate together and are sealed by an O-ring 150 and mechanically connected by fasteners inserted into mating pin holes 15P.

The lower end 16 of the housing 12 includes a threaded cavity 12TT for threadably receiving the threaded neck of a conventional gas cartridge (not shown). An actuator housing 22 is mounted about the housing 12 via threads 22T and 12T. The actuator housing 22 contains the actuation components (described below) for firing the inflator 10.

The housing 22 is grasped by the resilient arms 32A of a removable trigger pin 32P. The trigger pin 32P extends through a slot 32S formed in the side of the housing 22 to hold the actuation components in their cocked position ready for firing. Jerking on a tether (not shown) connected to a ring 32R integrally formed in one of the arms 32A, spreads the arms 32A apart to release their grip on the housing 22 and remove the trigger pin 32P from the slot 32S, thereby firing the inflator 10.

FIGS. 1C, 1D & 1E illustrate the actuation components that are contained within the actuator housing 22. The actuation components include a hollow large diameter pierce pin 18 reciprocatably positioned within an interior cylinder 28 threaded into the housing 12 via threads 28T and 12TTT. A power primer holder 24 is threaded into the cylinder 28 via threads 24T and 28TT. The holder 24 contains a consumable power primer 26 (see FIG. 1C). A ballasted firing pin 30 having a firing pin tip 30T is reciprocatably mounted within the housing 22 in axial alignment with the power primer 26. The ballasted firing pin 30 is constantly urged forwardly toward the power primer 26 by a compression spring 30S positioned within an annular cavity 30C (see FIG. 1E), but is held in its cocked position by the trigger pin 32P.

Upon firing by removal of the arms 32A by jerking on the tether, the arms 32A are released from around the housing 22 and the trigger pin 32P is pulled out of slot 32S. Once the trigger pin 32P is pulled out of slot 32S, the ballasted firing pin 30 urged forwardly by spring 30S to quickly slam the firing pin tip 30T into the power primer 26 to ignite the power primer 26. Upon ignition of the power primer 26, the ignition gases expand within the interior cylinder 28 sufficient force to drive the large diameter pierce pin 18 forwardly through the frangible seal of the gas cartridge, thereby cutting a large diameter hole therein. The gas escaping from the gas cartridge flows through the hollow pierce pin 18 then flows through its side ports 18P and into the manifold 14 to inflate the inflatable device.

FIG. 2 better illustrates the location of the threads 12T, 12TT and 12TTT on the housing 12. It is noted that an O-ring slot 12S may be provided for receiving an O-ring 12R in order to assure a tight seal between the housings 12 and 22.

FIGS. 3A & 3B better illustrate the side ports 18P of the hollow large diameter pierce pin 18 that allow a large volume of gas flowing from the gas cylinder to rapidly flow into the inflatable device via the manifold 14.

FIGS. 4A & 4B better illustrate the slot 32S formed in the side of the housing 22. The outer surface of the housing 22 may include a groove 22G for receiving the arms 32A better circular-centered around the housing 22.

FIGS. 5A & 5B better illustrate the location of the threads 24T on the holder 24. Likewise, FIGS. 6A & 6B better illustrates the location of the threads 28T and 28TT on the cylinder 28.

Figure 7A:
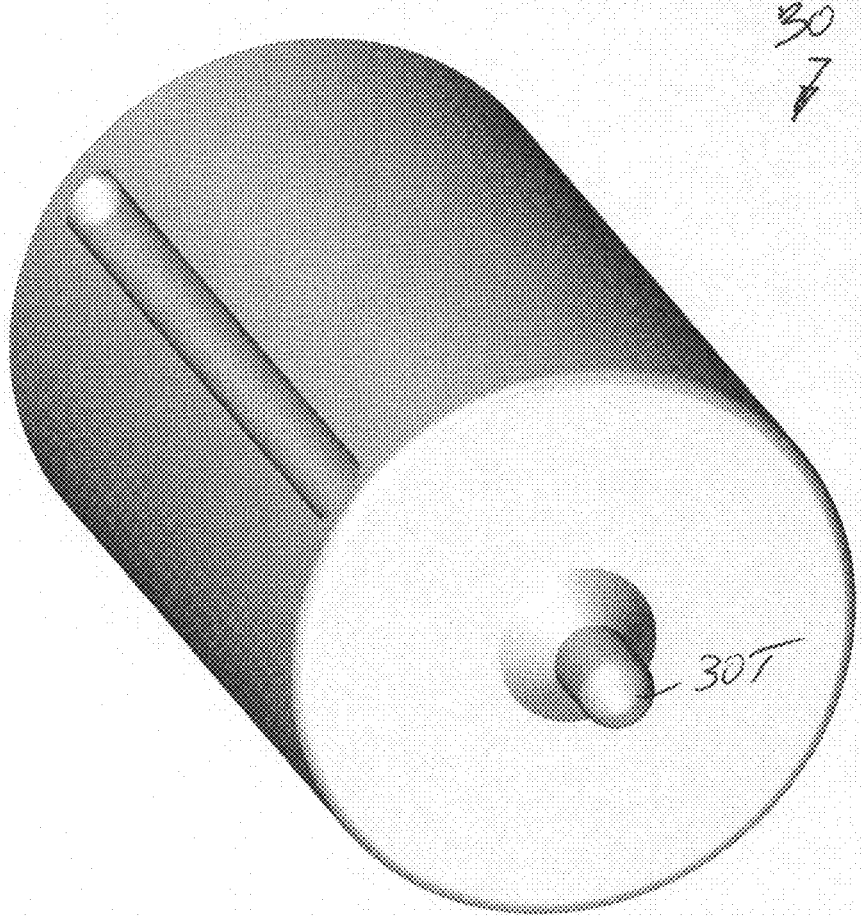
FIGS. 7A & 7B are perspective views of the ballasted firing pin of the inflator.
Figure 7B:
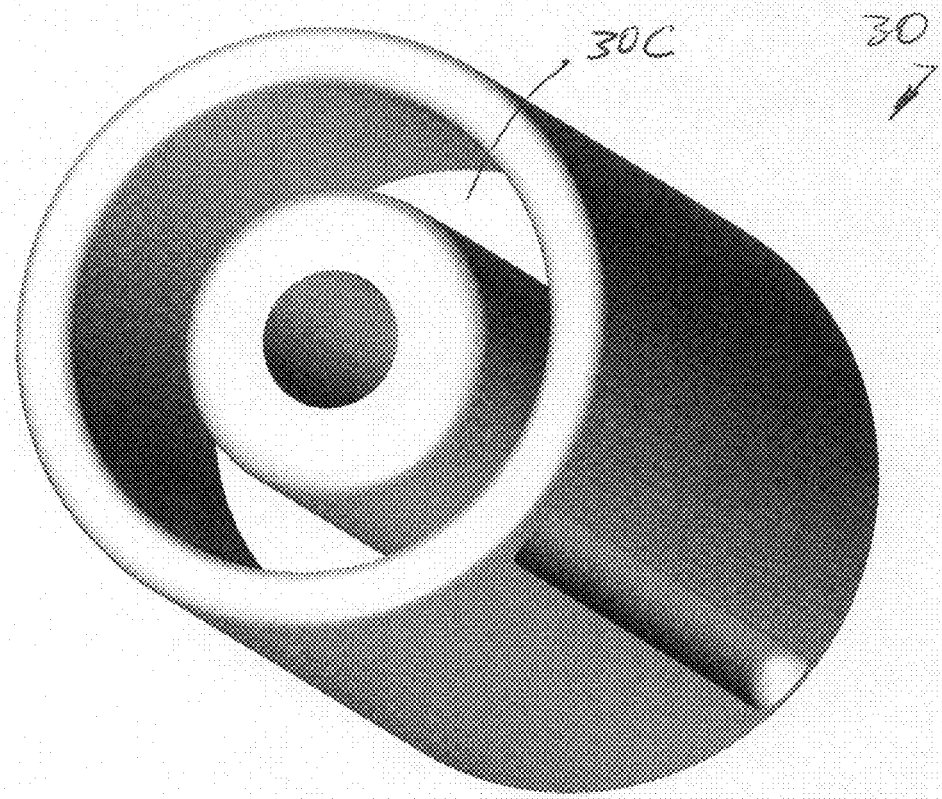

FIGS. 7A, 7B & 7C better illustrate the firing pin tip 30T and the annular cavity 30C of the ballasted firing pin 30.

The present invention includes that contained in the appended claims as well as that of the foregoing description. Although this description has been described in its preferred form with a certain degree of particularity, it should be understood that the present disclosure of the preferred form has been made only by way of example and that numerous changes in the details of construction, combination, or arrangement of parts thereof may be resorted to without departing from the spirit and scope of the invention.

Now that the invention has been described,

What is claimed is:

1. An inflator, comprising in combination:
    a housing having a manifold for sealing connection to an inflatable device, said housing adapted to receive the neck of a gas cartridge having a frangible seal sealing compressed gas therein;
    an actuator housing is mounted to said housing, said actuator housing containing:
        a hollow large diameter pierce pin reciprocatably positioned within an interior cylinder,
        a power primer holder connected to said interior cylinder, said power primer holder adapted to receive a power primer,
        a ballasted firing pin having a firing pin tip reciprocatably mounted within said actuator housing in axial alignment with the power primer holder,
        a spring for constantly urging said ballasted firing pin toward the power primer, and
        a trigger pin holding said ballasted firing pin in a cocked position, whereby
    upon firing by removing said trigger pin, said ballasted firing pin being urged forwardly by said spring quickly slams said firing pin tip into a power primer positioned within said holder to ignite the power primer whereupon ignition gases from the power primer expand within said interior cylinder with sufficient force to drive said large diameter pierce pin through the frangible seal of the gas cartridge, thereby cutting a large diameter hole therein and allowing the gas escaping from the gas cartridge to flow through the hollow pierce pin and into the manifold to inflate the inflatable device.

2. The inflator as set forth in claim 1, wherein said large diameter pierce pin includes side ports to direct the flow of escaping gases from the gas cylinder.

3. The inflator as set forth in claim 1, further including at least one arm grasping said actuator housing to removably position said trigger pin in position holding said ballasted firing pin in the cocked position.

4. The inflator as set forth in claim 3, further including a connector for connecting a tether to said arm allowing said arm to be removed upon jerking of the tether.

5. The inflator as set forth in claim 3, wherein said trigger pin extends into a slot in said housing to hold said ballasted firing pin in the cocked position until removal of the arm whereupon said trigger pin is removed from said slot.

6. The inflator as set forth in claim 3, wherein said housing further include a groove for receiving said arm.

7. The inflator as set forth in claim 1, wherein said actuator housing is threaded to housing.

8. The inflator as set forth in claim 1, wherein said holder is threaded to said interior cylinder.

9. The inflator as set forth in claim 1, wherein said interior cylinder is threaded to said housing.

10. The inflator as set forth in claim 1, wherein said spring comprises a compression spring mounted within an annular cavity in said ballasted firing pin.

* * * * *